United States Patent [19]

Sandaj et al.

[11] Patent Number: 5,868,270
[45] Date of Patent: Feb. 9, 1999

[54] BARBECUE DISCHARGE COLLECTOR

[76] Inventors: Jan Regan Sandaj; Brent Regan Sandaj, both of R.R. #3, Ayr, Ontario, Canada, N0B 1E0

[21] Appl. No.: 803,812

[22] Filed: Feb. 24, 1997

[30] Foreign Application Priority Data

Feb. 24, 1996 [GB] United Kingdom .................... 9603937

[51] Int. Cl.⁶ ....................................................... F16N 31/00
[52] U.S. Cl. ............................................................. 220/571
[58] Field of Search ..................................... 220/571, 572, 220/573

[56] References Cited

U.S. PATENT DOCUMENTS

| | | | |
|---|---|---|---|
| 18,987 | 4/1857 | Whipple | 126/242 |
| 1,072,333 | 9/1913 | Kelty | 126/242 |
| 2,378,628 | 6/1945 | Gray | 220/572 X |
| 2,772,627 | 12/1956 | Newell | 126/242 |
| 3,396,718 | 8/1968 | Anderson | 126/242 |
| 3,834,527 | 9/1974 | Howe | 126/242 |
| 3,997,073 | 12/1976 | Morris | 220/573 |
| 4,108,142 | 8/1978 | Barson et al. | 126/242 |
| 4,413,592 | 11/1983 | Jones | 126/242 |
| 4,574,977 | 3/1986 | Ellis et al. | 220/571 X |
| 4,599,938 | 7/1986 | Gongwer | 126/242 |
| 4,909,355 | 3/1990 | Ramos | 126/242 |
| 4,941,551 | 7/1990 | Visser | 126/242 |
| 4,966,126 | 10/1990 | Wu | 126/242 |
| 5,174,272 | 12/1992 | Clark | 126/242 |
| 5,226,559 | 7/1993 | Czajkowski et al. | 220/573 |
| 5,270,089 | 12/1993 | Alston et al. | 428/60 |
| 5,291,921 | 3/1994 | Devine | 220/571 X |
| 5,402,837 | 4/1995 | Dietzen | 220/573 X |
| 5,471,916 | 12/1995 | Bird et al. | 99/440 |

FOREIGN PATENT DOCUMENTS

| | | |
|---|---|---|
| 8002 | 7/1928 | Canada . |
| 2090695 | 3/1992 | Canada . |

*Primary Examiner*—Steven M. Pollard
*Attorney, Agent, or Firm*—R. Craig Armstrong

[57] ABSTRACT

Described is a discharge container mat for use under most barbecues in order to over come the problems associated with the dripping and spilling of grease and fat which falls from barbecues, mostly during the cooking process. The discharge container mat, by virtue of a combination of multiple projections in the surface of the mat and a retaining wall, provides a means of effectively catching and retaining such drips. In an embodiment of the mat there is further provided a filter means which allows for the release of water from the container portion of the mat whilst retaining the collected grease and fat.

4 Claims, 5 Drawing Sheets

BARBECUE DISCHARGE COLLECTOR

FIELD OF INVENTION

The present invention is in the field of the cooking arts in particular relating to methods for controlling oil and grease drippings from barbecues.

BACKGROUND OF INVENTION

Barbecues have been in use for a considerable number of years, however, it has only been in the last 10 years during which gas barbecues have become extremely popular and are more readily available to consumers. In general terms, such gas barbecues are constructed with a cooking containment area in which the heating and conking takes place. This is typically achieved with a two tier rack system. The food to be cooked is placed on the upper tier, level or rack. Below this is the second tier which is typically a rack onto which briquettes, or "lava" rocks, (cooking elements) are disposed. There is an element (heating element) below the level of the cooking element through which propane gas is ignited and by which an even controlled flame is maintained under the surface of the cooking elements.

Typically meats such as beef and chicken are cooked on barbecues and as a result of the cooking process significant oils and greasy liquids are produced from the cooking meat. In the prior art this grease typically falls to the bottom of the barbecue and is channeled to an exit port to the exterior of the cooking containment area, which exit was designed to direct grease drips out of the barbecue. In a number of barbecue models a tin can is located below this exit port however, tin cans are not always available and more often in other barbecue models the grease drains down a central column, which supports the cooking containment area of the barbecue, onto the ground below the unit. In short, grease drips off the cooking food and this usually, ultimately falls to the ground below the barbecue.

Grease and oil also drips off the lid of the barbecue when it is tilted back, i.e., when the cooking containment area is opened during the cooking process. Such grease and oils are deposited on the interior of the lid during the cooking process. Another source of grease and oil spills is through air vents which are typically located at the bottom of the containment area. Although such vents often have a lip to prevent grease from exiting via the air vent, after repeated use, debris builds up at the lip providing sufficient opportunity for grease to run over the lip out of the barbecue onto the surface below.

Coincident with the increased use of gas barbecues has been the popularity of outdoor stone patios and patio decks. Usually, the owner of a gas barbecue performs the cooking in the barbecue on these patio surfaces. The grease and oils which arise from the cooking process are consequently a problem in so far as the dripping and spilling of the grease soils and stains the surface on which the barbecue is located.

This problem has been addressed to a limited extent, for example, the use of a tin can at the exit spout. However, such solutions are inapplicable where the grease drains to a position well below the cooking surface as in the case where the exit port is through the bottom of a support column. Further, where water from rainstorms, or sprinkler systems fill such cans, the grease spills out of the can. In addition, often there is insufficient space for the placement of a can or it is simply not appropriate to use such an approach. Typical of systems which catch and guide grease to troughs is the art disclosed in U.S. Pat. No. 4,599,938 which borrows from the oven cooking art wherein broiling pans are used to catch and channel grease (see for example, U.S. Pat. No. 2,772,627).

A related problem exists in the automotive field wherein oil drips from the lower surface of automobiles which creates a soiling problem. Solutions to this problem include mats such as those described in U.S. Pat. No. 4,941,551 and U.S. Pat. No. 5,270,089 however, neither of these systems is appropriate for use in the cooking arts field because of their size, the difficulty with disposing the oil which is "caught" and their inability to deal with water such as in rainstorms.

SUMMARY OF THE INVENTION

The present invention overcomes the problems associated with the dripping and spilling of the grease and fat which falls from barbecues during the cooking process by providing a means of effectively catching and retaining such drips.

According to one aspect of the present invention there is provided means which catch drippings and spills of grease and fat which arise from cooking processes in barbecues so as to minimize splatter associated with such drips and spills.

According to a further aspect of the present invention there is provided means which retain dripping fats and oils which arise from cooking processes on barbecues, such that collected grease may be moved with ease and the collecting device can be easily cleaned for the purpose of reuse.

According to yet a further aspect of the present invention there is provided means which easily channels out of a container of the present invention, with minimal loss of the grease and oil which is retained in the container, water which either accidentally from water sprinkler systems and the like, or through rainstorms, or some other source, enters the container aspect of the invention.

According to one embodiment of the present invention there is provided a container, or discharge collection device consisting of a bottom flat mat-like surface which sits below a barbecue such that it rests on the surface on which the barbecue has been placed, for example a patio deck, on the ground, or on patio stones. The upper surface, or top side of the mat has retainer walls along the perimeter of the mat so as to provide containment of fluids falling onto the upper surface. The location of the retainer walls is important only insofar as they should create a container or collector for holding the spilled or dripping greasy liquids or oils. The shape of the perimeter of the mat may be any desired shape, but a preferred embodiment is rectangular in over all design.

According to another embodiment of the present invention there is provided means for reducing splatter produced by falling grease and fat from a barbecue by providing a surface that is not perpendicular to the falling liquid. According to a preferred embodiment, this is achieved by providing pyramidal structures on the upper surface of a mat in sufficient number, and positioned in sufficient quantities, and proximity to each other, such that drips falling from the barbecue are received and the angle from the flat horizontal surface of the mat to the peak of each pyramid is such that the drips are deflected mostly downwards.

According to a further preferred embodiment, means for reducing splatter produced by falling grease and fat from a barbecue is achieved by providing an accordion-like surface on a mat of the present invention with a sufficient number of folds such that drips falling from the barbecue are received and the angle from the flat horizontal surface of the mat to the peak of each fold is such that the drips are deflected mostly downwards.

According to yet a further embodiment of the present invention there is provided at least one, but preferably two or more, locations of the retaining wall where there is a trough or space in the wall which allows fluid to drain out of the container off the top side of the mat. In the trough or space there is provided a filter or similar device which will allow water and other such liquids to drain off the mat surface while retaining the fat and grease materials.

BRIEF DESCRIPTION OF THE DRAWINGS

Two embodiments of the present invention are illustrated in the accompanying drawings, in which, in respect of each of embodiment, like numerals denote like parts throughout the several views, and in which.

DETAILED DESCRIPTION OF THE INVENTION

Figure 1:
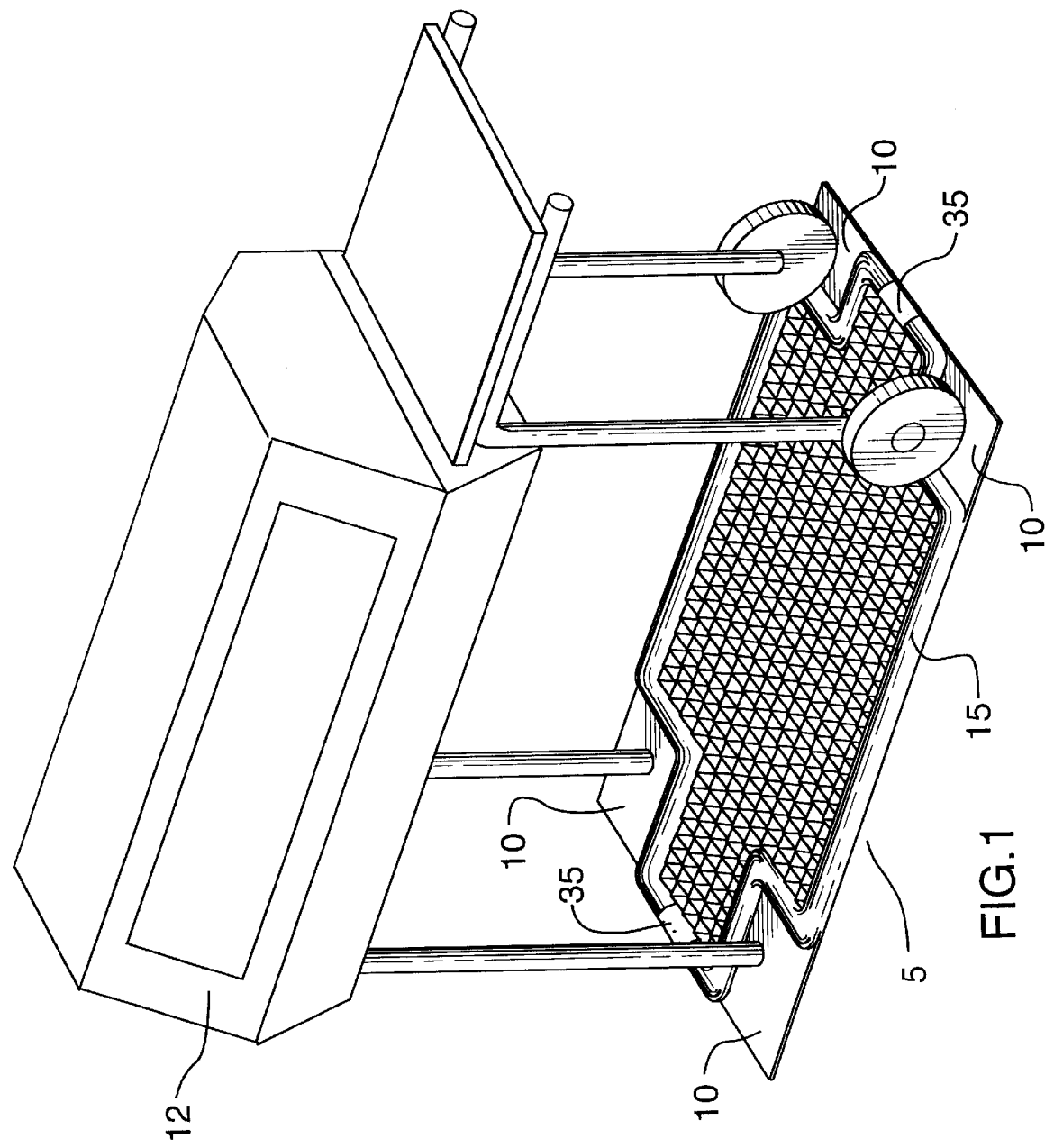
FIG. 1 is a perspective view of a discharge container mat of the present invention situated below a barbecue.
Figure 6:
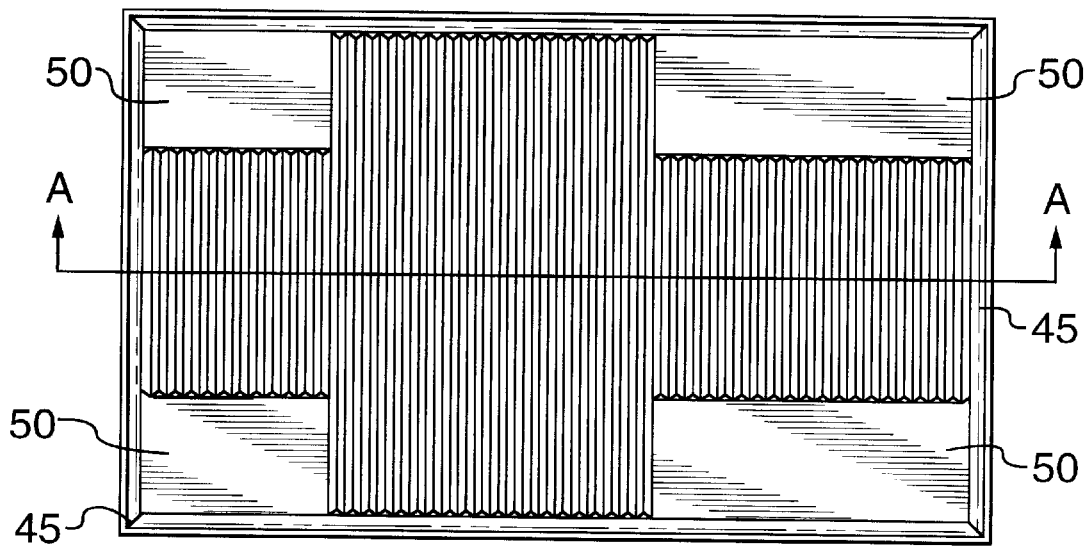
FIG. 6 is a top plan view of a second embodiment of a discharge container mat of the present invention.

With reference to the drawings, and beginning with FIG. 1, attention is directed to the fluid receiving, or discharge collection surface, 5 which in overall shape is rectangular. A pyramidal grid 20 accounts for most of the surface however disposed in the surface are elements 10 where the pyramidal grid 20 is removed to allow for positioning of the mat below a barbecue 12 (see FIG. 1). Such elements 50 are also provided in an alternative embodiment (FIG. 6). The weight of a barbecue rests on these elements of the mat and assists in fixing the mat in place. In alternative embodiments of the present invention, a barbecue does not rest on a portion of the mat, rather, the mat has only the pyramidal grid (or folds, or what ever projections, as the case may be) and is situated just under the barbecue. Returning to the mats illustrated in the Figures, the mats have at the perimeter of the portion of the mat with surface projections a retaining wall 15 which allows the mat to act as a container for fluids which drip or fall onto the surface (see all Figures).

The mat is preferably formed in one piece through a molding process and is made from a suitable material such as plastic or aluminum. The retaining wall of the mat 15 can be angled, curved or vertically disposed to the horizontal surface of the mat. Any other variations which achieve the goal of retaining fluid are understood to be within the scope of the present invention.

Figure 2:
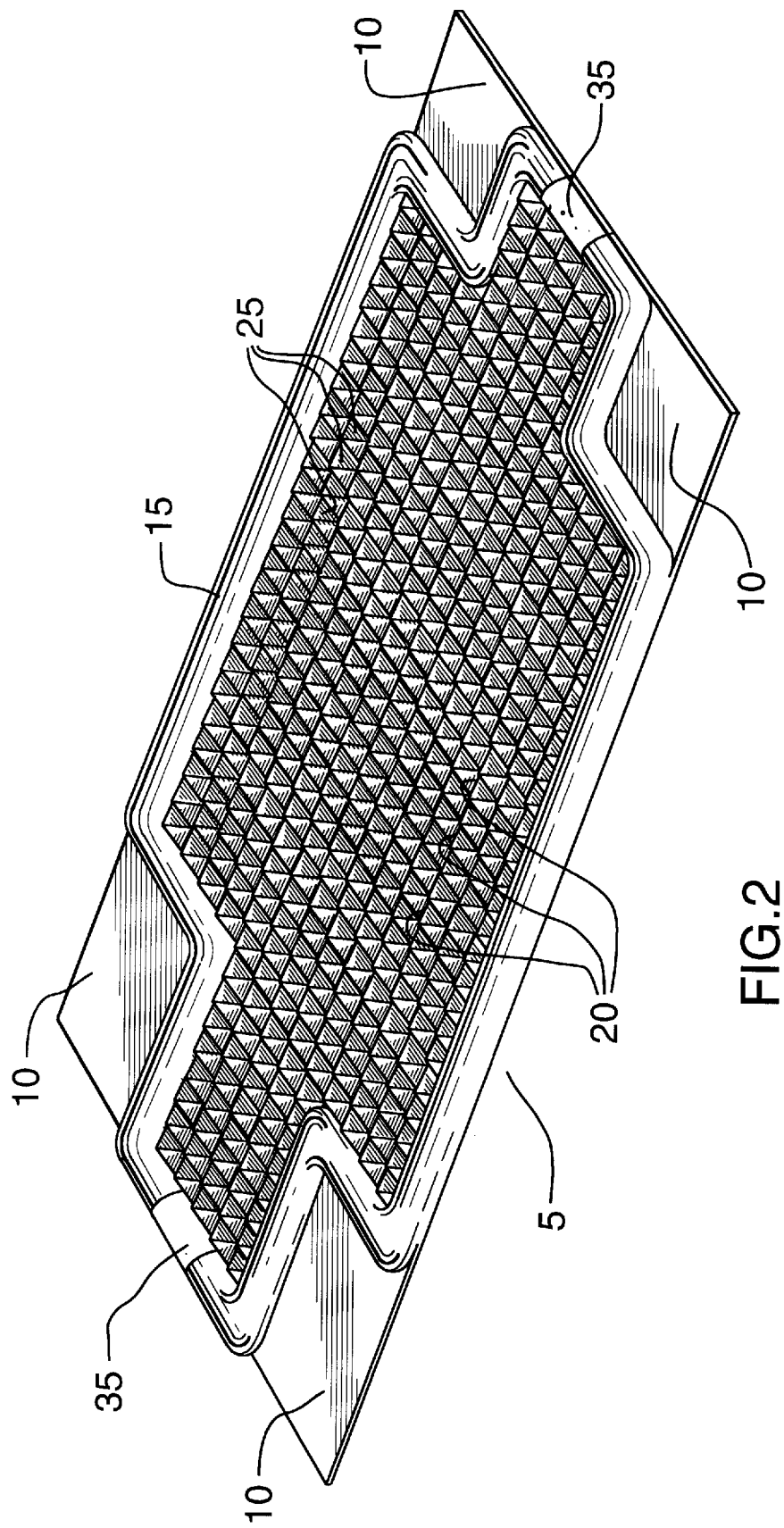
FIG. 2 is a perspective view of the discharge container mat as shown in FIG. 1 which illustrates a grid of pyramidal structures of the upper surface of the mat.

A generally flat bottom is provided out of which projections from the receiving surface 20, such as a grid of pyramids 25 (see FIG. 2), is integrally formed from a suitable material. In an alternative embodiment there is provided projections in the form of a grid of folds 40 in accordion-like fashion (see FIG. 6). Similarly, this alternative is formed from a suitable material such as aluminum or plastic. The bottom of the mat can be a flat surface, or it can be the reciprocal surface of a single sheet which is formed to present projections to the upper surface. Such projections would include the pyramids or folds of the two preferred embodiments illustrated and described in this specification. In a preferred embodiment, the reciprocal surface of the lower surface is such that the container mats of the present invention nest one on top of the other.

Figure 3:
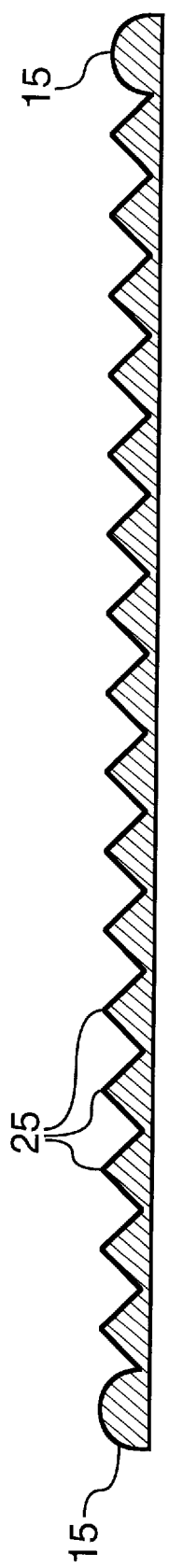
FIG. 3 is a mid longitudinal cross-sectional view of the mat as illustrated in FIG. 1.
Figure 5:
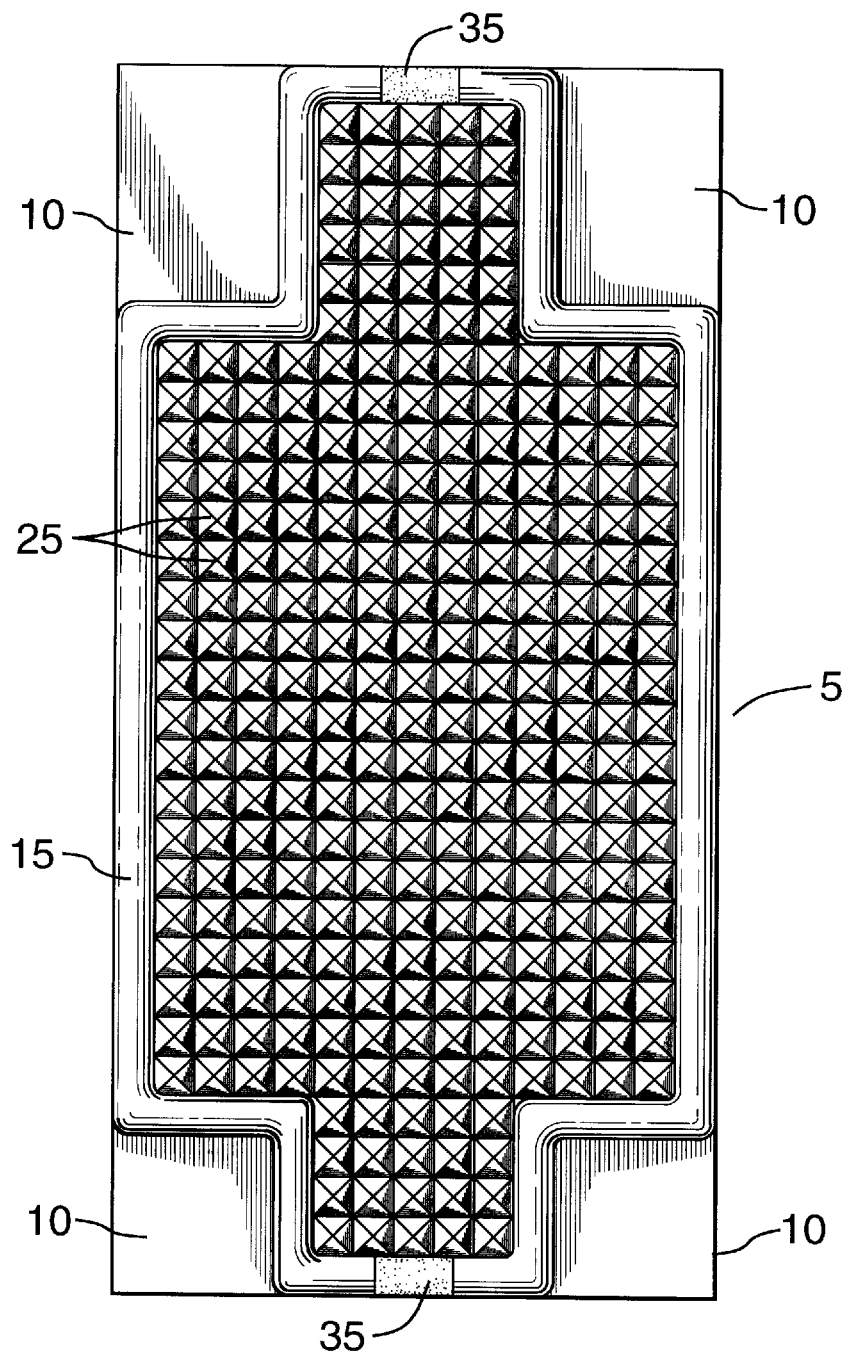
FIG. 5 is a top plan view of the mat as shown in FIG. 1.
Figure 7:
FIG. 7 is a mid-longitudinal cross-sectional view of the mat of FIG. 6.

Referring to FIG. 3 the angle of the walls of the pyramids is variable. This is also true for the folds of the embodiment illustrated in FIGS. 6 and 7. The preferred angle is that which achieves maximum downward displacement of drips falling to the surface of the mat and maximum prevention of splattering of failing liquids. In a preferred embodiment this angle is 45 degrees. The overall height of the pyramids 25 or folds 40 is such that the mat can fit below most barbecues, although in some embodiments the pyramids or folds may be higher or lower. The height of the pyramids or folds can also be variable from pyramid to pyramid or from fold to fold however in preferred embodiments, the height is uniform. The height of the retaining wall can be higher or lower than the height of the pyramids or folds. However, in the preferred embodiment shown in FIG. 1 the height of the walls and the pyramids is uniform while in the alternative embodiment the height of the walls 45 is greater than the folds (See FIG. 7). Although in two preferred embodiments the shape of the receiving surface is a pyramidal grid (FIG. 5) and folds (FIG. 7), an alternative embodiment could be a grid of inverted cones or any other shape which provides a means for preventing splattering of the liquid which falls onto the surface of the mat. The spacing between the inverted cones or pyramids should be such that there is a limited opportunity for liquids falling onto the surface of the mat to impact the space between pyramids or cones. In a preferred embodiment the bases of the pyramids are in contact with one another such that there is no flat, or horizontal space between pyramids (see FIG. 3). This is true also for the bases of the folds (FIG. 7), in both cases the projections forming a grid at the surface of the mat.

Figure 4:
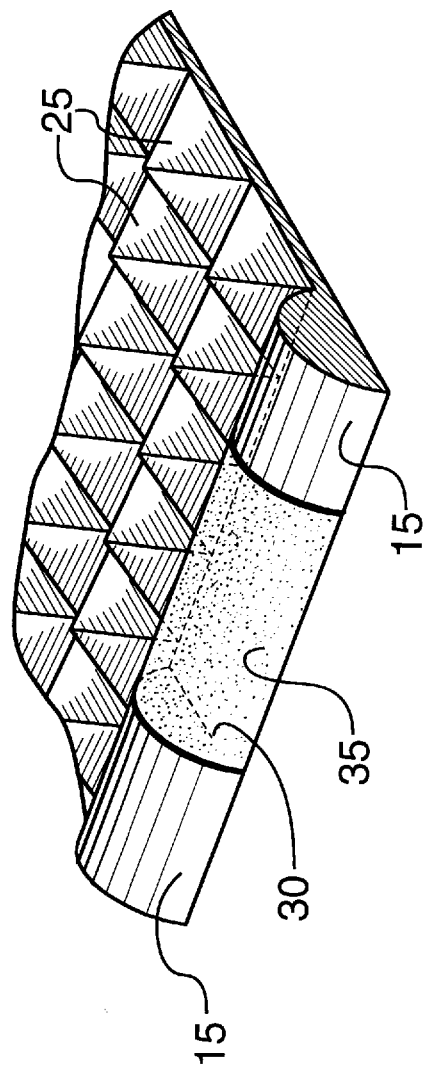
FIG. 4 is a detailed view of the filter portion of the mat of FIG. 1.

Referring to FIG. 4, a trough is shown disposed in the peripheral retaining wall of the mat of FIG. 1 at a number of locations and in a preferred embodiment this is placed at two ends of the rectangular mat surface 30. The trough Is disposed into the wall so as to allow fluids to drain off the surface of the mat, i.e., the base of the trough is at the same plane as the plane of the base of the pyramids. A filter 35 prevents the flow of grease and fat off the surface of the mat while allowing free flow of water off the surface of the mat. This is particularly useful in rainstorms where rain falling onto the surface of the mat, In the absence of such a trough and filter system, could overflow.

Thus it can be seen that the present invention provides a simple means for overcoming problems associated with the dripping and spilling of the grease and fat which falls from barbecues, particularly during the cooking process.

While the invention has been particularly shown and described with reference to preferred embodiments, it will be understood by those skilled in the art that various other changes in form and detail may be made without departing from the spirit and scope of the invention.

We claim:

1. A container mat for use under most barbecues for collecting falling greasy fatty discharges and the like from said barbecues, said container mat comprising:
    a) an upper surface onto which most of said discharges are received;
    b) a lower surface; and
    c) a retaining wall
    wherein said upper surface is mostly comprised of projections which are accordion-like folds in shape which minimize splatter associated with said falling discharges, each of said projections having a peak and a base, the bases of said projections being in contact with one another so as to form a grid and so as not to have any horizontal space between projections, said retaining wall defining a perimeter for said upper surface, wherein four locations on said upper surface do not contain said projections, said locations providing a surface for each of said barbecues to rest on said upper surface of said container mat.

2. The container mat of claim 1 wherein said projections are pyramidal in shape.

3. A container mat for use under most barbecues for collecting falling greasy fatty discharges and the like from said barbecues, said container mat comprising:

a) an upper surface onto which most of said discharges are received;

b) a lower surface; and c) a retaining wall wherein said upper surface is mostly comprised of projections which are accordion-like folds in shape which minimize splatter associated with said falling discharges, each of said projections having a peak and a base, the bases of said projections being in contact with one another so as to form a grid and so as not to have any horizontal space between projections, said retaining wall defining a perimeter for said projections, said upper surface of said mat extending beyond said retaining wall a sufficient distance at four locations to provide a surface for each of said barbecues to rest on said upper surface of said container mat.

4. The container mat of claim 3 wherein said projections are pyramidal in shape.

* * * * *